United States Patent [19]

Vorguitch

[11] 3,906,669
[45] Sept. 23, 1975

[54] WINDOW ASSEMBLY

[75] Inventor: Xavier A. Vorguitch, Chatsworth, Calif.

[73] Assignee: Lockheed Aircraft Corporation, Burbank, Calif.

[22] Filed: Mar. 2, 1973

[21] Appl. No.: 337,747

[52] U.S. Cl. .................. 49/372; 49/62; 49/63; 49/453; 49/34
[51] Int. Cl.² .......................................... E05F 11/38
[58] Field of Search ......... 49/372, 141, 34, 40, 453, 49/14, 62, 63, 374, 378; 160/89–91, 105

[56] References Cited
UNITED STATES PATENTS
3,150,749   9/1964   Robrecht et al. ................ 49/141 X
3,691,686   9/1972   Donegan ............................ 49/40 X

*Primary Examiner*—Kenneth Downey
*Attorney, Agent, or Firm*—Billy G. Corber; Frank L. Zugelter; Lowell G. Turner

[57] ABSTRACT

A window assembly for incorporation in an aircraft which provides protection and access to the interior side of the aircraft pressure window. A window shade is mounted in the assembly and is formed of a stiffly flexible construction which can be arched to a point where it can be removed from the assembly. A transparent pane to protect the pressure window and positioned between the shade and the interior side of the pressurized window, can then be dislodged and slidably moved upwardly in a plane parallel to the pressure window, exposing the interior side of the pressure window for cleaning. The pane can be made of stiffly flexible plastic so that it can also be removed for cleaning when desired.

7 Claims, 8 Drawing Figures

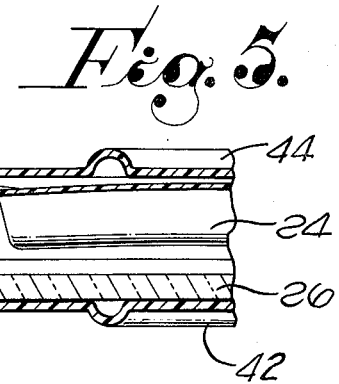
Fig. 5.
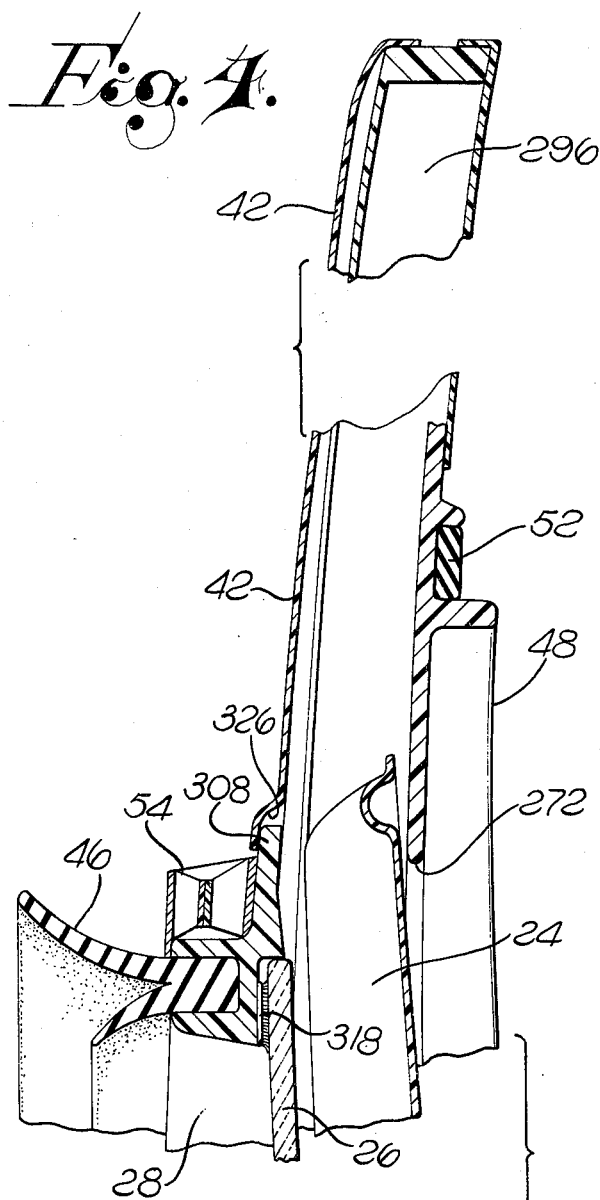
Fig. 4.
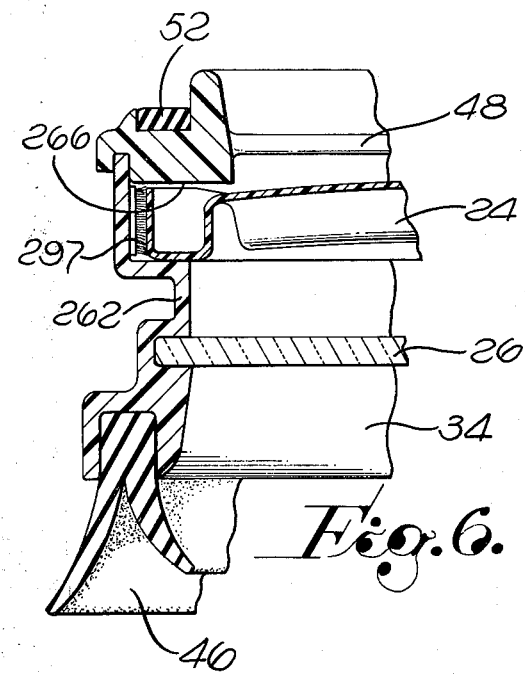
Fig. 6.
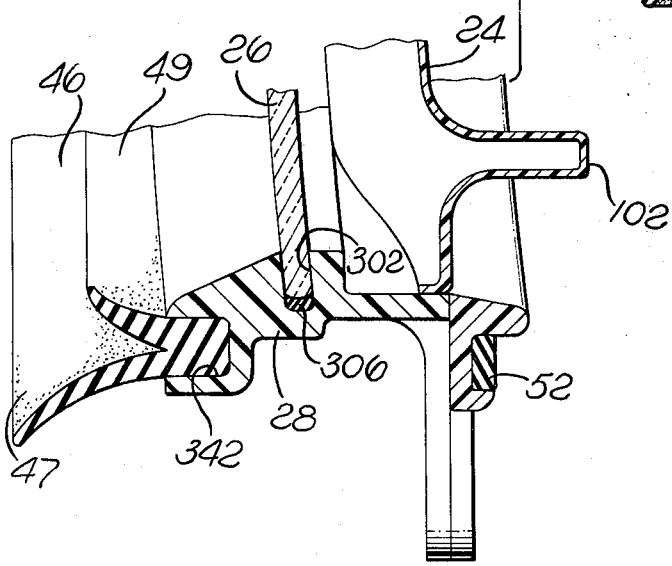

3,906,669

WINDOW ASSEMBLY

FIELD OF THE INVENTION

The field of art to which the invention pertains includes the field of aircraft window assemblies.

BACKGROUND OF THE INVENTION

In order to clean conventional aircraft windows, the entire shade-window assembly, which includes a protective pane between the window and shade, must be removed from the interior panel of the aircraft.

Removal of such assemblies requires large amounts of man hours as well as necessitating the removal of the aircraft from flight. Such assemblies are relatively heavy and of complex construction. Removal of the window assembly normally requires removal of side panels and of seats of the aircraft adjacent the window. Furthermore, it has been found that even during normal use by passengers, conventional shades often scratch the window pane which is provided to protect the pressure window from scratching damage by the passengers.

In order to overcome the attendant disadvantages of prior art window assemblies, the present invention provides a novel, light weight shade-window-pane assembly. The assembly is of neat appearance and provides easy access to both the protective pane and the interior surface of the pressurized window. The window shade and protective pane can be easily removed by one person without removal of a side panel of the aircraft or adjacent seats.

Particularly, the assembly comprises a stiffly flexible (semi-rigid) shade, formed with a slightly bowed contour. Thus, during manufacture, the shade is radiused to form a slight bowing across its width, enabling further arching thereof to a point where it can be sprung out of its tracks in the window shade assembly. The protective pane is slidably disposed in side edge tracks and retained at its top edge. It can be dislodged and slidably moved upwardly along its tracks to expose the interior surface of the aircraft pressurized window. The protective pane is flexible so that it can be bowed out of the assembly, should it be necessary or desirable to clean the pane surface adjacent the pressurized window. After cleaning, the protective pane and shade are easily replaced by merely reversing the removal procedure. The entire assembly is relatively lightweight, thus allowing higher aircraft payload, and the materials of construction are relatively inexpensive, allowing replacement at minimum cost.

The advantages of the invention, both as to its construction and mode of operation, will be readily appreciated as the same becomes better understood by reference to the following detailed description when considered in connection with the accompanying drawings, and in which description like reference numerals designate like parts throughout the figures.

BRIEF DESCRIPTION OF THE DRAWINGS

FIG. 4 is a side-sectional view, partially broken away, illustrating the window of FIG. 2 taken along the line 4—4 thereof;

FIG. 5 is a partial sectional view of the window of FIG. 2, taken along the line 5—5 thereof;

FIG. 6 is a partial sectional view, broken away, of the window of FIG. 2 taken along the line 6—6 thereof;

DETAILED DESCRIPTION

Figures 1, 2:
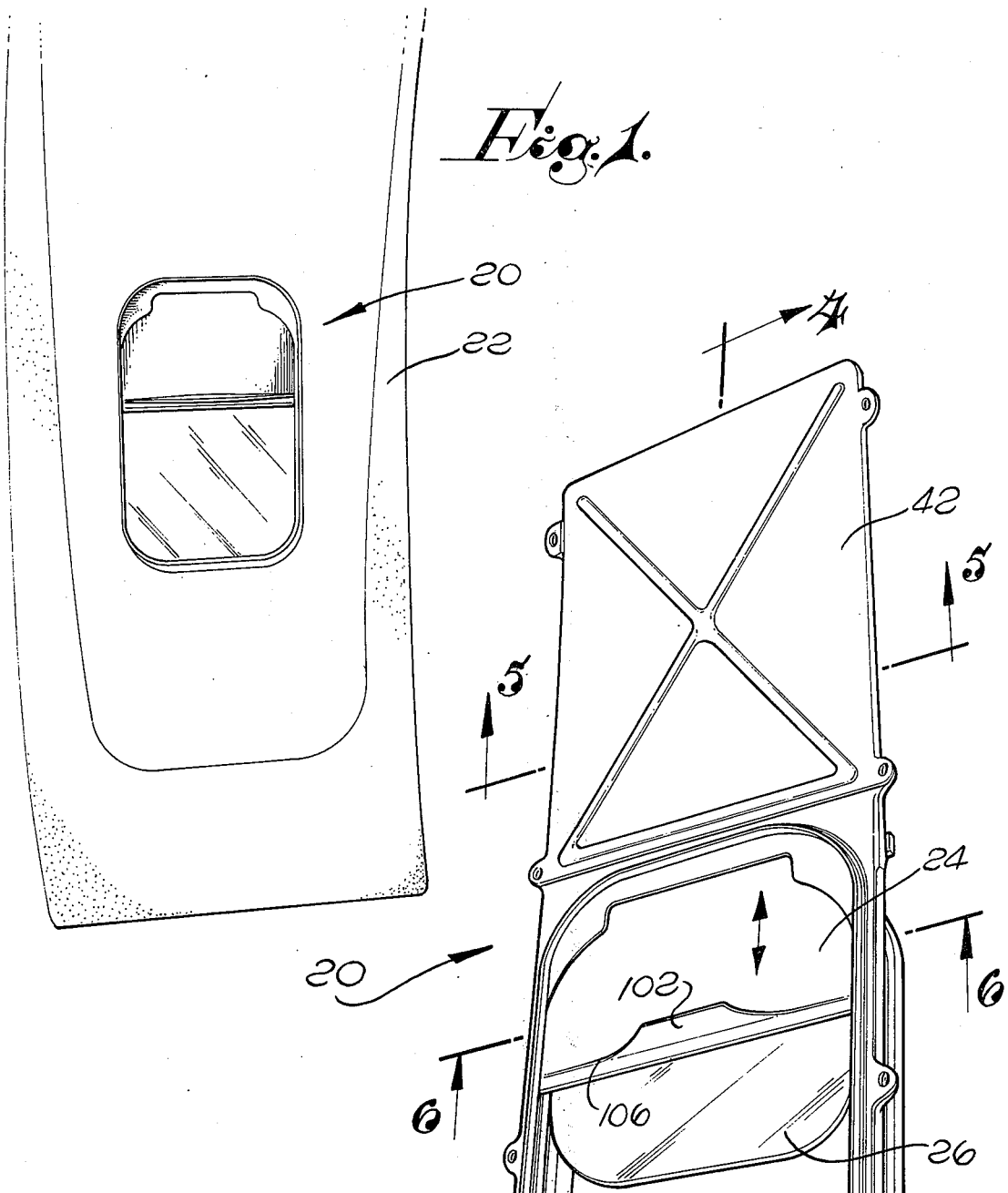
FIG. 1 is a view of an aircraft panel, illustrating the window assembly of the present invention mounted therein.
FIG. 2 is a perspective view of the window assembly of FIG. 1 with both the shade and pane raised to better illustrate the components.

Referring now to FIG. 1, there is shown an aircraft window assembly 20 whose construction is in accordance with the present invention. It should be understood, however, that similar constructions are adaptable to other forms of installation such as on buses and trains. The assembly is mounted within a side panel 22 of the aircraft.

Referring now to FIG. 2, the window assembly is formed of a shade 24 which is normally movable in a vertical direction and enables a passenger seated adjacent the window assembly to block out sunlight as desired. Positioned between the shade 24 and the aircraft pressurized window (not shown) is a protective pane 26 for the pressurized window and which is normally made of plexiglass and is normally mounted in a fixed position and not movable by the passenger. For clarity of illustration, the protective pane 26 is shown in a position where it has been moved upwardly in the window assembly while the shade is in place; however, in normal maintenance procedure, the shade 24 would be removed prior to movement of the pane 26.

Figure 3:
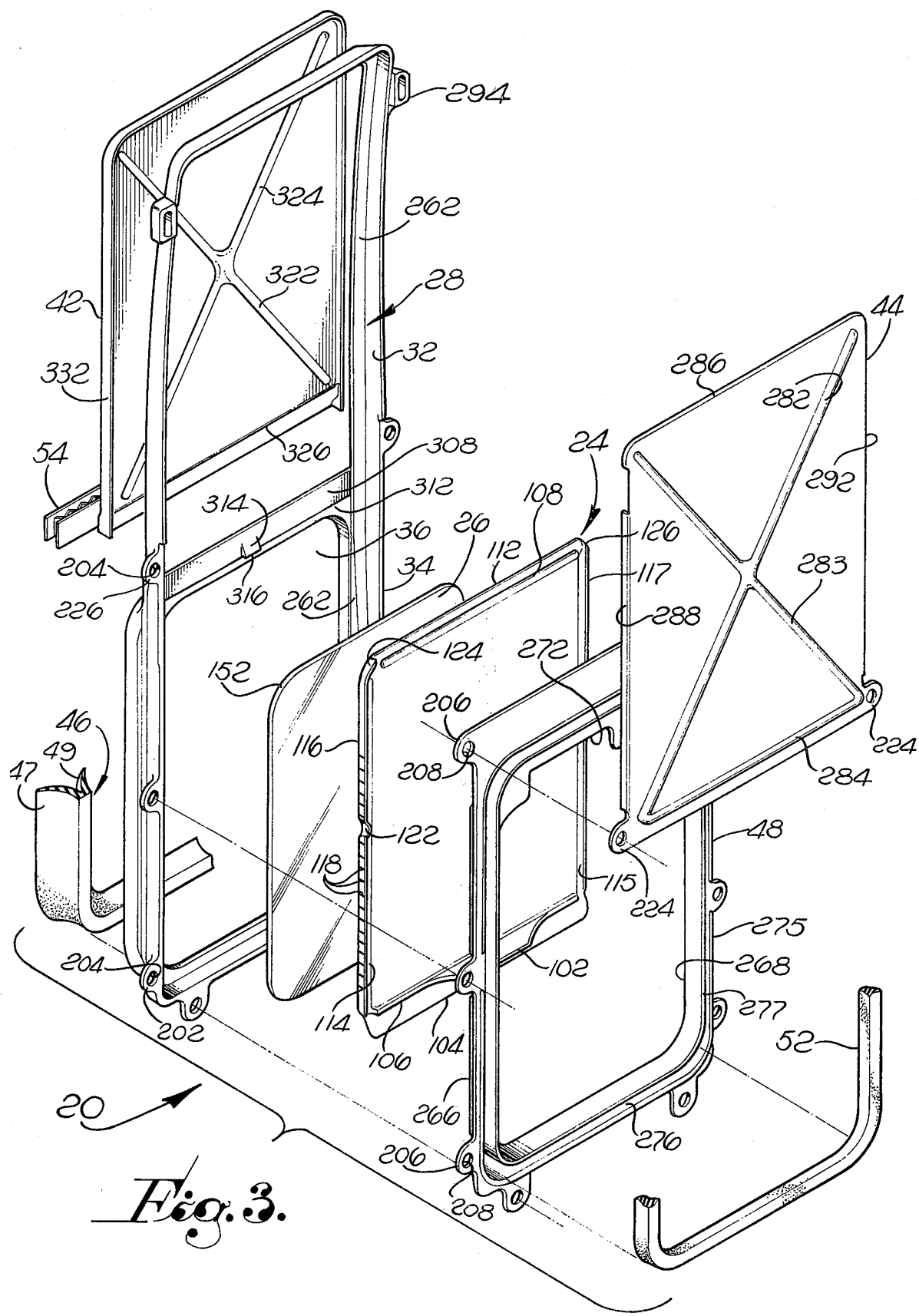
FIG. 3 is an exploded perspective view of the window assembly, illustrating the various parts thereof.

Referring now to FIG. 3, the window assembly 20 is shown in an exploded, perspective view. The shade 24 and pane 26 are normally slidably mounted in a main window assembly frame 28. The main frame 28 is divided into an upper frame half 32 and a lower frame half 34. The lower frame half 34 contains an opening 36 which is viewed by the passenger sitting in an adjacent seat and in which the shade 24 is movable. A pair of cover panels 42 and 44 are joined and disposed edgewise within the upper frame half 32 to form an envelope into which the shade 24 and pane 26 can be raised. The cover panels 42 and 44, together with the main frame 28, thus form a protective covering for the raised shade 24 and the pane 26.

A two-bladed dust seal 46, of generally V-shaped cross-sectional configuration is positioned so that the seal base (apex) of the dust seal is mounted in a groove 342 (in FIG. 4–not visible in FIG. 3) in the lower frame half 34 of the main window assembly frame 28. The blades 47 and 49 of the dust seal abut the aircraft frame so as to form a seal therewith.

Positioned interiorly adjacent the lower half 34 of the main frame is a front frame sub-structure 48, the side edges of which cooperate with the side edges of the main frame half 34 to define a track (FIG. 6) for the side edges of the shade 24, enabling the shade 24 to slide between the lower frame half 34 and the front sub-frame 48. In addition, a gasket 52 surrounds the front periphery of the sub-frame 48 to form a sealing surface between the sub-frame 48 and the interior panel 22 of the aircraft.

A stiffening bar 54 is mounted exteriorly on the main window assembly frame, on a frame portion which is approximately midway between the upper and lower frame halves.

The window shade 24 is normally made of a single piece of molded polycarbonate material, which is opaque and thereby can be used to block incoming light transmitted through the aircraft pressurized window. The shade 24 is stiffly flexible, having structural integrity, but bendable, and is generally rectangularly shaped and thin. During manufacture, the shade 24 is radiused to form a slight bow across its width to enable arching to a point where it can be sprung out of the assembly tracks, as will be explained hereinafter. A handle is integrally formed, by indentation to the interior side of the shade 24 across and adjacent the shade lower edge 104, tapering at 106 toward the side edges to provide a medial tab 102. The tapering handle, which can be termed a web, is formed to each end, in a concave manner with respect to a plane generally defining the shade member, for retaining the radiused bow of the shade, as well as avoiding scratching of the pane as it slides in the window assembly. Further, the concavity of the handle prevents load concentration on the shade adjacent thereto.

At the top surface of the shade 24, a stiffening ridge 108 is formed by indentation to the exterior side of the shade and is oriented across the shade width adjacent the upper edge 112. The stiffening ridge 108 aids in preventing rattling of the shade when it is mounted in the housing. Longitudinally extending grooves 114, 115, formed by indentation to the exterior of the shade 24 and which face the aircraft interior, are formed along the lateral edges 116, 117 of the shade, respectively, also to stiffen the shade member and to provide tracks for facilitating sliding of the shade.

A plurality of beads 118 are integrally formed (or may be mounted) and spaced along the length of at least one of the lateral edges 114, 115 for sliding engagement with the assembly frame so as to provide point bearings to reduce friction between the shade edges and the frame. At least one notch 122 may be provided in one of the lateral edges of the shade for engagement with a key member or plunger (not shown) in the window assembly to hold the shade in a stationary position intermediate the extreme sliding positions. The edge material between the beads is serrated (not shown) to eliminate any ratchet-like noise which might otherwise occur as the shade is slid. The top of the lateral edges 116, 117 can be tapered to the upper edge 112 to ramp-like surfaces 124, 126, respectively, thereto in order to facilitate insertion of the shade 24 into the assembly frame 28.

The protective pane 26 is normally made of plexiglass or other stiffly flexible, transparent material. The pane is made sufficiently flexible so that it can also be bent and removed from the window assembly. In addition, the corners 152 of the pane 26 are curved so as to prevent injury to someone removing the pane.

The main frame of the window assembly 28 which is formed of the upper and lower halves 32 and 34, respectively, as well as the exterior cover 42 and the interior cover 44, is also typically made of polycarbonate material. The main frame 28 is formed in a concave contour similar to the contour of the aircraft interior wall.

The front sub-frame 48 is positioned against the interior facing surface of the lower frame half 34 of the main window assembly frame 28. A plurality of lugs 202, having openings 204 are spaced around the periphery of the lower frame bottom half 34. The frame lugs 202 are aligned with similarly disposed lugs 206 on the front sub-frame 48 periphery and have openings 208 aligned with the frame lug openings 206, enabling fastening devices to secure the main frame to the front subframe as well as to an aircraft structural member (not shown). Additionally, the interior cover 44, is formed with lugs 224 extending from its lower corners and in alignment with lugs 226 medially positioned on opposite sides of the main window assembly frame edge. The cover 44 is secured to the main window assembly frame 28 by means of screws threaded through the lugs 224 and 226, as well as to an aircraft structural member (not shown). It should be noted that the lugs 226 of the main window assembly frame are utilized to secure both the interior cover 44 as well as the front sub-frame 48.

The shade 24, which is movable along the interior surface of the window assembly main frame 28, is spaced from the pane 26 by means of a flange 262 of the frame 28 and which flange 262 extends internally along both sides of the main frame 28 and along the bottom thereof. The interior edge surface of the shade 24 abuts the rear edge surface 266 (which faces the exterior of the aircraft; see FIG. 6 for clarity) of the front sub-frame structure 48 when positioned in the bottom half of the main window assembly frame 28. The front sub-frame 48 contains an interior central opening 268 through which, passengers can see when the shade 24 is raised. In addition, it should be noted that the upper internal edge of the front sub-frame 48 is cut away to form a keyway 272 into which the handle of the shade 24 fits so that a maximum viewing area can be provided. The front surface of the sub-frame 48 further contains an annular bead 275 which cooperates with an annular lip 277 to form a channel 276 aroung the periphery thereof. The channel 276 faces the interior of the aircraft to receive the gasket 52 to form a tight fit with the aircraft interior paneling (not shown).

The interior cover 44 is formed of stiffly flexible polycarbonate material and is indented to form diagonal crossribs 282,283, across its front surface and which continue as a front facing bottom rib 284 extending along the bottom edge of the cover. The top and side edge surfaces of the cover 44 are folded over rearwardly to form retaining edges 286 and 288,292 respectively. Portions of the retaining edges 288 and 292 are removed where they interface with lugs 294 on the assembly frame 28. When the openings in the interior cover lugs 224 are aligned with the openings 204 midway in the main frame, lugs 226 and the retaining edges 286,288, and 292 are positioned over the top and side edges of the upper frame half 32, an annular track 296, illustrated in FIG. 4, is formed. The track 296 provides the passageway for the side edges of the shade 24 when the shade 24 is moved into the upper frame half 32 of the main window assembly. The sides of the track can be lined with felt material 297 as shown in FIG. 6 to facilitate smooth movement and impart positioned stability so that the shade can be retained in any desired position.

Referring to both FIGS. 3 and 4, a groove 302 is formed in the window assembly main frame 28 in a plane generally parallel to the track 296 but rearwardly thereof. At the bottom surface of the groove 302, a thin pad or rubbery member 306 may be inserted so that when the pane 26 is in the normal closed position as shown in FIG. 4, the pane will not rattle in the groove. The groove 302 extends upwardly along the sides of the main window assembly main frame 28 and terminates at a transversely extending section 308 which divides the upper and lower frame halves 32 and 34. The front surface of the transverse section 308 is formed with a downwardly facing shoulder 312 and a medial lip 314 having a downwardly facing shoulder 316. The downwardly facing shoulder of the lip 316 holds the pane in place in its normal position. In addition, a thin felt strip 318 is affixed across the transverse section shoulder 312 to prevent the pane 24 from rattling.

When cleaning the interior surface of the permanent pressure window of the aircraft, it is necessary to move the pane 26 into the upper frame half 32 of the main window assembly frame. The interior surface of the exterior cover panel 42, together with the confronting surface of the flange 262 which lies in the upper frame half 32 provides an extension of the lower frame-half groove 302. The rear cover panel 42 is similar to the front cover 44 and also contains diagonally extending exteriorly facing ribs 322 and 324 for stiffening the cover panel. In addition, the internal surface of the rear cover panel 42 is formed with a downwardly facing shoulder 326 spaced from and extending across the bottom edge of the cover panel 42 for positioning the cover panel 42 adjacent the top edge of the transverse section 308. The side and top edges of the cover panel 42 are folded over forwardly to form retaining edges 332 positioned, after assembly, along the exterior edge of the upper frame half 32 and can be glued thereto so as to securely position the cover panel.

Referring more particularly to FIG. 4, the exterior surface of the main window frame assembly 28 is formed with the exteriorly facing groove 342 which extends along the bottom edge of the lower frame half, as well as along the sides therof, and continues across the transversely extending section 308. The apex of the dust seal 46 is inserted into the groove 342 and normally can be secured thereto by glue or other adhesive. The dust seal blades 47 and 49 abut the interior surfaces of the main frame of the aircraft so as to provide the desired seal with the aircraft. A hole (not shown) may be provided in the dust seal 46 to drain off condensation. With such construction, the exterior facing surface of the pane 26 normally does not get dirty. However, if the pane 26 does become dirty, it can be removed easily from the main window frame assembly as will be explained hereinafter.

In order to obtain access to the interior surface of the pressure window of the aircraft, it is necessary to first remove the shade 24 from the main window assembly frame.

Figure 7:
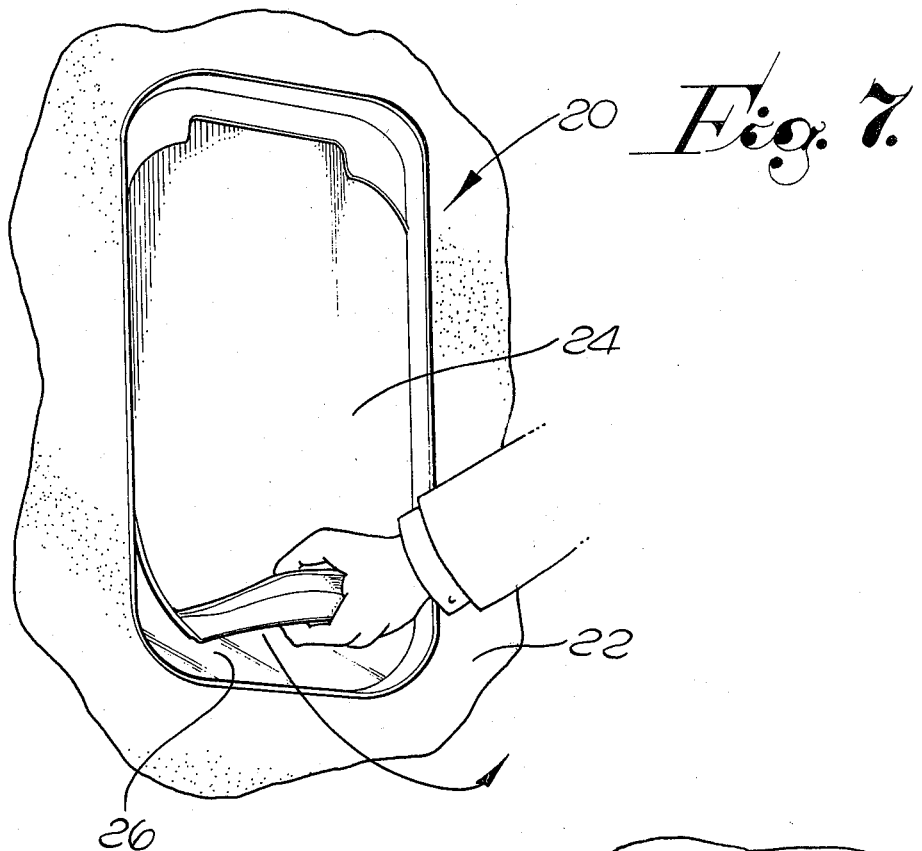
FIG. 7 is a front view of the window of FIGS. 1-6, illustrating the method of removing the shade assembly therefrom.

As is illustrated in FIG. 7, the shade 24 is grasped by the handle tab 102 and raised slightly above its closed position. Due to its radiused condition, the shade readily bows in the center and can be easily pulled out of the window assembly frame. The shade 24 is then pulled outwardly in the direction shown by the arrow in FIG. 7 to provide access to the pane 26. To replace the shade 24, it is merely necessary to bow the shade slightly and replace it in the assembly, aligning its edges with the track 296.

Figure 8:
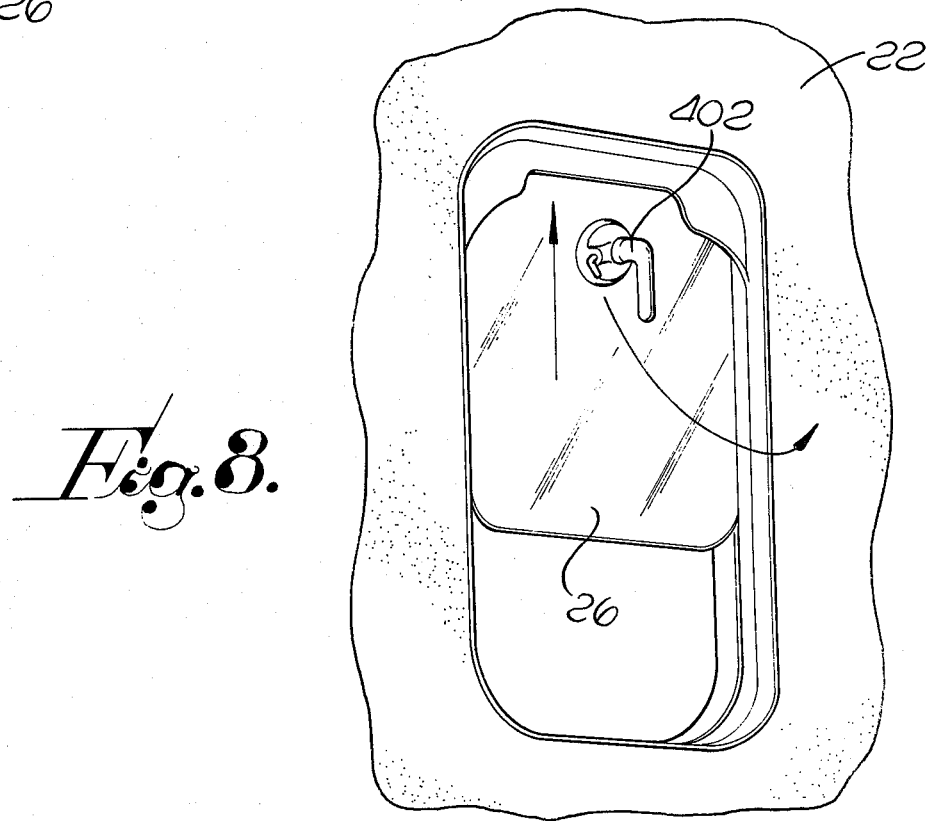
FIG. 8 is a perspective view of the window of FIG. 7, with the shade removed, illustrating the method of dislodging the protective pane.

If the pane 26 is not dirty on its exterior facing side, it is merely necessary to raise the pane into its channel formed in the upper frame-half 32 by the interior surface of the panel 42 and the confronting surface thereto of the flange 262. This can normally be accomplished by placing a suction cup 402 or cups on the pane. The pane is then dislodged by pulling it away from the frame so that its upper transverse edge is free of the lip 314 and the downwardly facing shoulder 316. Then, as is illustrated in FIG. 8, the pane (after removal of the suction cup) is moved upwardly in the groove 302 where it passes into the channel formed, as noted, by the flange 262 and the exterior cover 42, thereby providing access to the interior pressure window of the aircraft. Should it be necessary to clean the exterior side of pane 26, it can be bent in its lower frame-section of the window assembly in a manner similar to the bending of the shade and removed from the assembly. Replacement of the pane can be done in a similar manner as that of the shade.

Thus, as can be readily seen, access to the interior surface of the pressurized window of the aircraft is easily obtained without removal of any panels of the aircraft or seats therein. The process is relatively simple and requires only a few seconds to remove the shade and pane.

What is claimed is:

1. A window assembly for providing access to the interior surface of a vehicle window, comprising in combination:

a main frame section and a sub-frame section mounted thereon, said main frame section including an envelope portion, a window shade member slideable between said main and sub-frame sections and formed of a flexible material, means defining a first channel in said main frame section and sub-frame section, said shade member being mounted in said first channel and movable to a position in said envelope portion to visibly expose the vehicle window interior surface, said shade member being sufficiently flexible so that it is removable from said main frame section, means defining a second channel in said main frame and spaced exteriorly from said first channel, a flexible transparent window slidably disposed in said second channel between said shade member and vehicle window, and means normally retaining said flexible transparent window in a fixed position in said main frame section, said flexible transparent window being deformable to permit the latter to be moved into said envelope portion thereby providing for access and exposure to the vehicle window.

2. A window assembly in accordance with claim 1 wherein said shade member is radiused to form a bow across its width for facilitating removal of said shade member from said channel means.

3. A window assembly in accordance with claim 1 wherein said pane is made of flexible material enabling said pane to be bent and removed from said assembly.

4. The window assembly of claim 1 wherein said channel means comprises an exterior cover panel forming said sub-frame section and a confronting surface formed on said channel means disposed in said sub-frame section.

5. A window assembly for a vehicle and adapted to be mounted in the structural side wall thereof comprising:
- a window frame assembly in compliance with the contour of said vehicle, said window frame assembly being divided into a main frame section and sub-frame section;
- said main frame section including means defining an opening and adapted to be positioned adjacent to a permanent window member fixedly positioned as part of said structural side wall of said vehicle;
- means in said main and sub-frame sections defining a channel;
- a slideable and flexible pane member normally mounted in said main frame section and in a first plane generally parallel to the permanent window and said opening, and aligned therewith;
- an opaque, flexible shade member mounted in a second plane generally parallel to said first plane and movable in said channel for blocking light entering said vehicle at said opening; and
- means defining a second channel in said main frame section for sliding movement relative thereto and therin of said pane in a plane generally parallel to said first plane;
- whereby said flexibility of said shade and said pane enable the side edges thereof to be bent at an angle to said plane for removal thereof without disassembly of said window assembly or the vehicle structure.

6. The improvement of claim 5 including a radiused said shade member to form a bow across its width for facilitating removal of said shade member from its channel means.

7. The window assembly of claim 5 wherein said channel means comprises an exterior cover panel and a confronting panel disposed on said main frame section.

* * * * *